United States Patent [19]

Hurley, III

[11] 4,316,552

[45] Feb. 23, 1982

[54] WIRE EGG CASE

[75] Inventor: George L. Hurley, III, Philomath, Oreg.

[73] Assignee: Hensway, Inc., Corvallis, Oreg.

[21] Appl. No.: 146,388

[22] Filed: May 5, 1980

[51] Int. Cl.³ .............................................. B65D 6/08
[52] U.S. Cl. ...................................................... 220/19
[58] Field of Search .......................................... 220/19

[56] References Cited

U.S. PATENT DOCUMENTS

| | | | |
|---|---|---|---|
| 2,925,206 | 2/1960 | Hancock | 220/19 |
| 2,979,242 | 4/1961 | Van Huis | 220/19 |
| 3,338,466 | 8/1967 | Hare | 220/19 |
| 3,349,942 | 10/1967 | Hitz | 220/19 |

FOREIGN PATENT DOCUMENTS

| | | | |
|---|---|---|---|
| 1280705 | 11/1961 | France | 220/19 |
| 1289438 | 2/1962 | France | 220/19 |
| 211744 | 2/1924 | United Kingdom | 220/19 |

*Primary Examiner*—George E. Lowrance
*Attorney, Agent, or Firm*—Kolisch, Hartwell & Dickinson

[57] ABSTRACT

A case for holding within it tiers of egg-holding trays. The case includes a wire-strand floor, and wire-strand end walls joined to and projecting upwardly from opposite ends of the floor. A hinged, wire-strand cover closes of the top of the case. The cover and floor include tray-seating means for seating trays. The case is sideless to promote loading of trays within the case.

3 Claims, 5 Drawing Figures

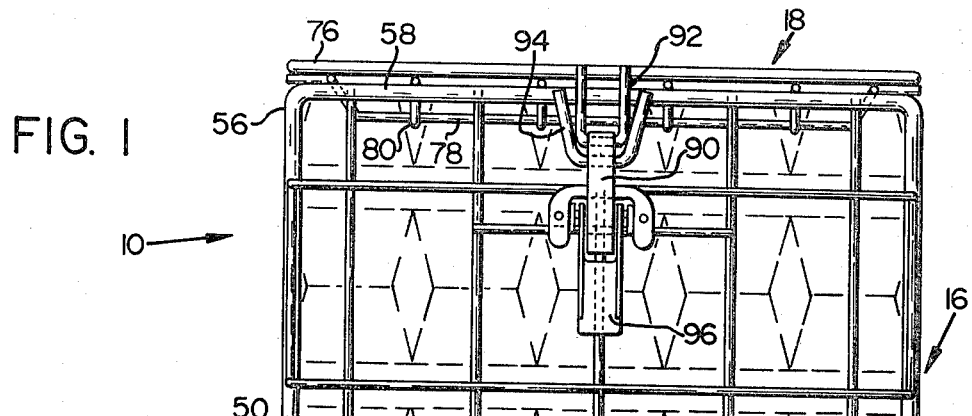
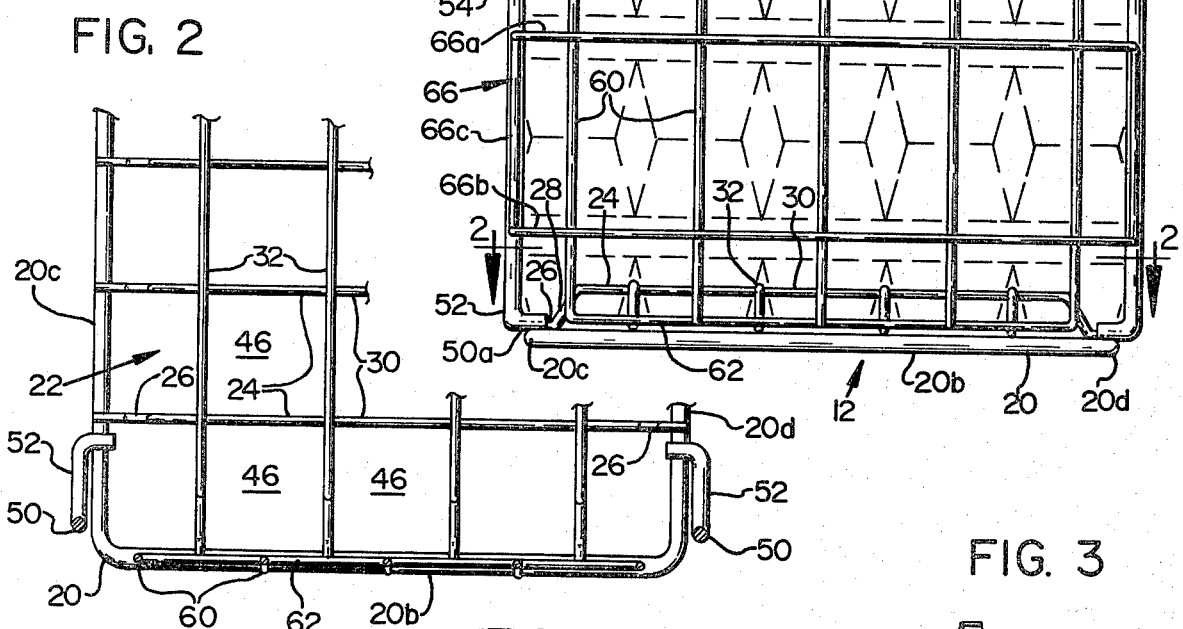
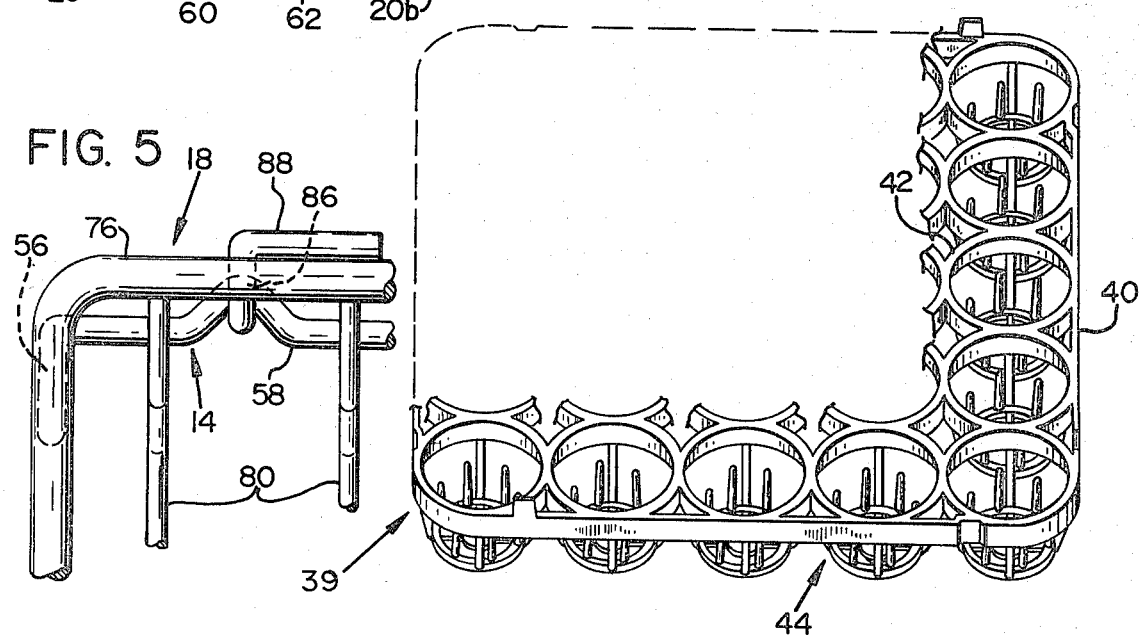

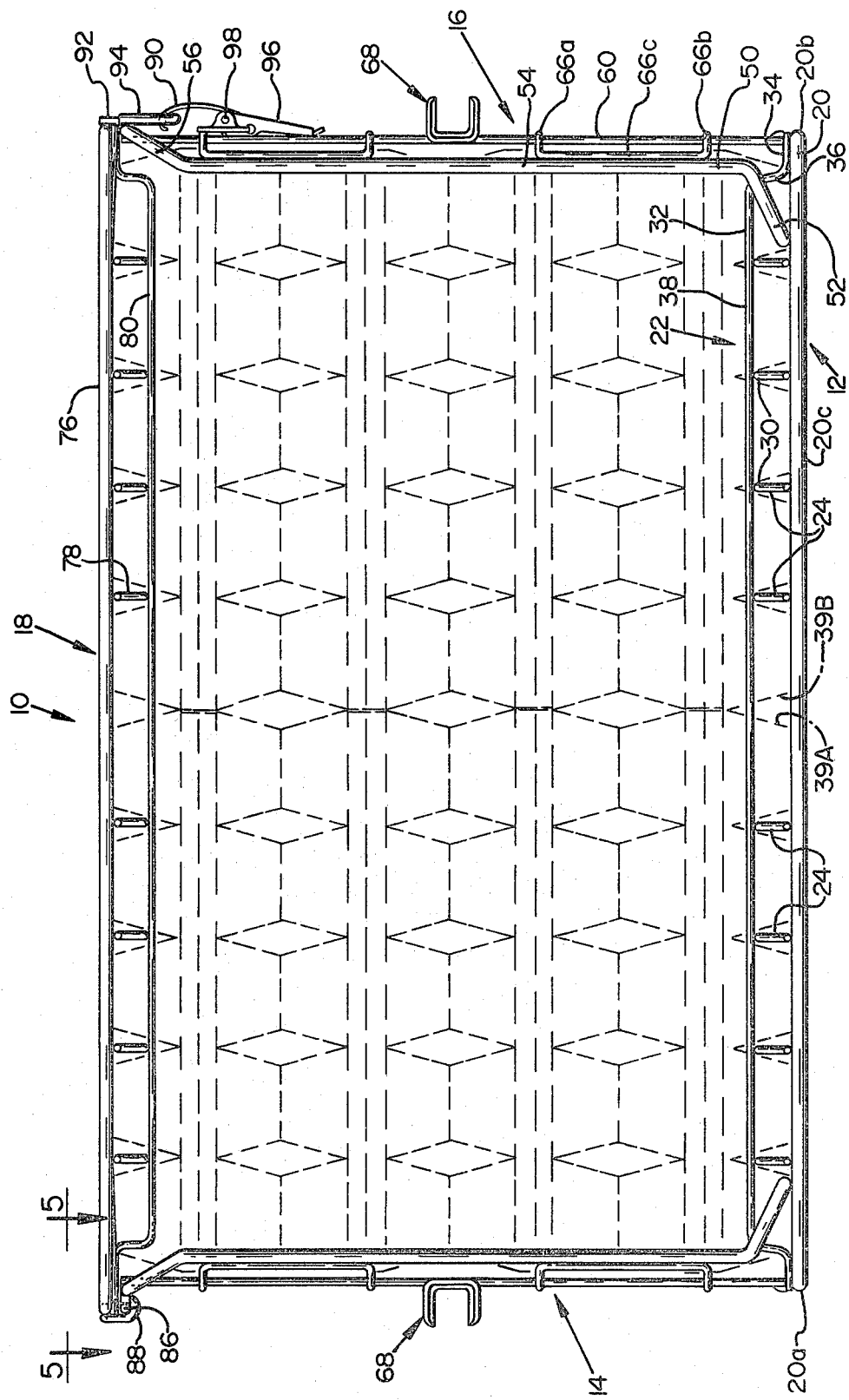

WIRE EGG CASE

BACKGROUND AND SUMMARY OF THE INVENTION

This invention relates to a receptacle or case, of the type that may be used to hold tiers of eggs with the eggs lodged in flats or trays.

In the past, a common method of incubating eggs has comprised placing the eggs in trays and loading the incubator with these trays, tray at a time. With hatching of the eggs, the incubator is unloaded, again tray at a time. With a large incubator holding a considerable number of trays, obviously loading and unloading an incubator in this manner is time consumming, and requires considerable manhandling of the eggs.

It has been conventional practice in preparing eggs for incubation to gather the eggs where they are laid and place these in paper flats. Such are subsequently loaded into trucks and transported to the hatchery where they are unloaded and stored. Then the eggs are removed from the paper flats and retrayed in dipping flats, after which the flats are loaded into dipping baskets and the eggs are dipped to disinfect them, etc. The eggs are then placed in incubator trays prior to loading the incubator with the eggs. As can be seen from the operations just summarized, the practice has required several retraying or repackaging of the eggs, again a time consumming process.

The subject of the present invention is a case constructed to enable the stacking within it of multiple tiers of eggs with such eggs packed within trays. With the case loaded with trays, the trays are held immovably within the case. Thus, the case can be used in loading, in one operation, multiple tiers of eggs into an incubator, through the expedient of loading a loaded case into the incubator. Further, if desired, the case may be utilized in the transporting of eggs from the point where the eggs are laid to the hatchery. The case has a construction which permits the free circulation of fluid therethrough, either air or liquid. As a consequence, the case may be left in the incubator during the incubation period, and may be used in the holding of multiple tiers of eggs while they are subjected to a dipping process. In fact, it is contemplated that by using the case of the invention, and with the proper selection of trays for holding the eggs, eggs may be arranged in the trays and the trays packaged in the case at the place where the eggs are laid, and the eggs left as so containerized throughout the time that they are shipped to the hatchery, stored, dipped and subjected to incubation.

A general object of the invention, therefore, is to provide a case for holding tiers of eggs housed in trays, with the trays securely held from movement when housed within the case.

Another object is to provide such a case which is constructed in such a manner as to facilitate the loading and unloading of trays into and from the case. Toward these ends, the case features what is referred to herein as a sideless construction, permitting unimpaired movement of trays into the case from the top and through the sides of the case.

The case of the invention features a perforate or skeletal construction for a floor and end walls present in the case, as well as a cover which closes off the top, this feature together with the open side walls promoting free circulation of air or other fluids such as dipping liquid throughout the interior of the case in the event the case is used for dipping or incubating the eggs.

Yet another feature and object of the invention is to provide such a case which is provided with seating means for seating the bottoms of egg trays deposited therein, with such seating means elevated from the bottom surface of the floor in the case. A similar seating means is provided in the cover for seating the tops of trays held within the case.

Yet a further object is to provide a case suitable for holding tiers of eggs which is stackable on another like case with the two cases then being locked together, which facilitates the making of tiers of cases, as may be required, for instance, in the loading of a truck for transport.

These and other objects and advantages are attained by the invention, as will become more fully apparent from a reading of the following description, which is to be taken in conjunction with the accompanying drawings, wherein:

BRIEF DESCRIPTION OF THE DRAWINGS

FIG. 1, is an end view of a case constructed according to the invention;

FIG. 2, is a plan view of portions of the floor in the case, taken generally along the line 2—2 in FIG. 1;

FIG. 3, is a perspective view of portions of an egg tray which may be used in loading eggs within the case;

FIG. 4, (second sheet of drawings) is a side view of the case shown in FIG. 1; and FIG. 5, (first sheet of drawings) illustrates in plan portions of a cover in the case and its hinge connection to an end wall.

DETAILED DESCRIPTION OF THE INVENTION

Referring to the drawings, the case generally indicated at 10, includes a floor generally designated at 12, and rigidly joined to this floor and projecting upwardly therefrom a pair of opposed end walls 14, 16. Spanning the upper ends of these end walls is a cover 18.

The floor, end walls, and cover have a perforate construction. More specifically, they are made of spaced, wire strands joined as by welding to each other. Thus, the case offers minimal obstruction to the passage of a fluid therethrough, such as air used in incubation, or the liquid which commonly makes up a dipping liquid formulation.

Considering in more detail the construction of floor 12, such includes a wire, floor frame member 20, which extends in a rectangular course on the underside of floor 12, thus to include end reaches 20a, 20b and side reaches 20c, 20d.

The floor also includes restraining means for holding the bottoms of egg-holding trays, whereby on such trays being placed within the case, they are held from lateral shifting. More specifically, such means comprises a wire grid or seating means 22 which is spaced above frame member 20 forming the bottom of the floor, with apertures in this grid shaped to seat egg-holding cups or wells forming the bottom of a tray.

Further describing this seating means 22, spanning the sides of the floor, and provided at spaced intervals along the length of the floor, are plural, wire-strand cross members 24. Each includes, as best seen in FIGS. 1 and 2, a foot portion 26 at each of the opposite ends of the member secured as by welding to the base member 20. Joined to and inclining upwardly from each foot portion is an inclined portion 28, and joining the upper extremities of these inclined portions is a horizontal expanse 30, extending in a plane elevated above frame member 20.

Extending the length of the floor, and provided at intervals spaced across the width of the floor, are longitudinally extending wire-strand longitudinal member 32. These have a construction similar to cross members 24, in that each includes a foot portion 34 (refer to FIG. 4) at each of its opposite ends, an inclined portion 36 joined to each foot portion and inclining upwardly therefrom, and a horizontal expanse 38 joining upward extremities of inclined portions 36. Foot portions 34 are welded to frame member 20, and horizontal expanses 38 of the longitudinal members may be secured as by welding to the horizontal expanses 30 of the cross members where such cross each other. The wire grid described forms a type of truss structure adding rigidity to the floor.

In FIG. 3, there is pictured an egg tray 39 which forms the subject matter of my co-pending application entitled EGG TRAY, having a filing date of Mar. 20, 1980. Referring to FIG. 3, such egg tray includes a flange 40 forming the perimeter of the tray face, and flange portions 42 extending in circular courses and defining openings through which eggs are inserted, these openings being located within the perimeter formed by flange 40. Projecting rearwardly on the tray from the face of the tray, and associated with each opening, is structure 44 forming a cup or well for receiving the end of an egg placed in the tray. In the tray pictured, five rows each containing five wells are present, whereby the tray has in all 25 such egg-receiving wells (for simplicity reasons, many of such wells have not been drawn in detail). For further explanation of the egg tray and its construction, reference is made to the co-pending application above referred to.

The wire-strand cross members and longitudinal members above described form a horizontally extending grid, as best illustrated in FIG. 2. In this grid, openings, such as opening 46, are defined, with each adapted to receive a cup or well of the egg tray just described. In the case illustrated herein, two of such trays may be placed on the floor of the case as illustrated by the dashed outlines 39A and 39B in FIG. 4, such trays being positioned end-to-end over the floor of the tray. When seated on the seating means 22, the trays become positioned with their bottoms disposed above the plane of the bottom surface of frame member 20.

End walls 14, 16, are of similar construction. Thus, and referring to end wall 16 shown in FIGS. 1 and 4, each comprises a wire, end wall frame member 50 having an upright leg on each of the opposite sides of the case. Each leg includes a turned-in end 50a at the bottom thereof, joined as by welding to frame member 20. Progressing from such an inturned end, each leg of the member includes an inclined portion 52, a vertical expanse 54, and an inclined portion 56. A top expanse 58 joins the inclined portions of the two legs.

Also part of an end wall is a grid comprising vertical reaches 60 of wire strand joined adjacent bottom ends by horizontal reach 62. Top ends of the vertical reaches are secured as by welding to horizontal reach 58 of frame member 50. As can be seen in FIG. 4, the vertical plane of vertical reaches 60 is spaced somewhat outwardly on the end of the case from vertical expanses 54 of end wall frame member 50. Thus, each end wall member presents, adjacent each of opposite sides of the case, a flange portion extending along the side of the case. These flange portions confine extremities of trays fitted within the case.

Also forming part of the end wall are two band structures 66, each made up of an upper expanse 66a, a lower expanse 66b, and turned-in portions 66c. Upper and lower expanses are joined as by welding to reaches 60, and the turned-in portions are joined as by welding to vertical expanses 54 of end wall frame member 50.

Channel-shaped elements 68 may be provided which extend transversely of the end walls and are secured to the end walls, for the purpose of mounting the cases within an incubator.

Cover 18 includes a cover frame member 76, in the form of an elongate wire strand extending in a rectangular course. Cross members 78 similar to cross members 24 have foot portions secured to opposite side reaches of the cover frame member. Longitudinal wire strand members 80 similar to longitudinal members 32 extend the length of the cover and have extremities secured to cover frame member 76. Where the cross members and longitudinal members cross each other they may be secured together as by welding. Thus, a wire grid is formed which is similar to the wire grid or seating means described in connection with the floor of the case.

When a tray such as is illustrated in FIG. 3, is used in the nesting of eggs, the top ends of eggs seated in the tray may be covered and snugly held by placing over the tray another like tray which is inverted. A flat assembly is thus produced of two trays which have faces abutting each other, and egg-receiving wells projecting upwardly and downwardly from the abutting faces. As illustrated in FIG. 4, two of such flat assemblies may be placed end-to-end on the floor of the case to form a lower tier of assemblies, and three tiers of additional flat assemblies placed over the two on the floor of the case, to completely fill the case. With the case completely filled, the two inverted trays forming the top of the upper tier of flat assemblies will have their upwardly projecting egg-receiving wells seated within the openings defined by the wire grid which is part of the cover in the case. In this way, the upper most inverted trays within the case are held from lateral shifting.

As brought out in the co-pending application earlier referred to, provision is made for locking together trays that face each other in a flat assembly, as well as trays that face away from each other. With this organization, and when the case is filled with trays, the trays themselves interlock with each other, and upper-most and lower-most trays are, in effect, locked to the cover and floor of the case. Additionally, margins of trays are confined within the side flanges earlier described.

The cover is movable from its position spanning the upper edges of the end walls so as to open up the top of the case. More specifically, and referring to FIG. 5, top expanse 58 of the end wall frame member in end wall 14 includes a U-shaped bend 86 adjacent each of its ends. A wire hinge clip 88 (refer also to FIG. 4) secured to cover frame member 76 extends around each U-shaped bend. The structure forms a hinge means enabling the cover to be swung about a horizontal axis upwardly and to one end of the case, thus to open up the top of the case.

The end of cover 18 which overlies end wall 16 is detachably secured to the end wall by a clasp 90 which has its upper, hooked and fitting over the bottom extremity of a U-shaped catch 92. A U-shaped guide 94 secured to end wall 16 functions to center the catch between the sides of the end wall with the cover occupying its lowered position. The clasp is pivotally mounted on a handle 96 and the handle itself is pivotally supported on the end wall by pivot 98. As seen in FIG. 4, with swinging of the lower end of the handle upwardly and to the right, the clasp is released from catch 92, thus to free the cover whereby it may be swung away from a position closing off the top of the case.

The case depicted is stackable on another case constructed like it, with the two then becoming locked together, by reason of the fact that frame member 20 at the floor of the case has outer, side-to-side and end-to-end dimensions which are slightly less than the inner, side-to-side and end-to-end dimensions of frame member 76 in the cover. Thus, placement of a similar case on top of the case described may be performed with the frame member in the floor of the upper case nesting within the space surrounded by the expanses of frame member 76 in the cover of the lower case.

The case shown is sideless, in that there are no side walls in the case. With the cover swung open, there is nothing extending between the end walls or joining the end walls but for the floor. By reason of this feature, unhindered movement of egg trays into the case, either from the sides or from the top, is permitted.

The case, by reason of its wire-strand construction, is of light mass. At the same time, the case is sturdy and capable of withstanding the usual handling that might be expected in the handling of eggs. In this connection, the restraining means provided at the floor and on the cover of the case has a truss-like construction, adding considerable rigidity to the cover and floor.

The case described is well suited for the handling of multiple trays of eggs during incubation. At the same time, the case may be used in the holding of eggs on their being collected at the point of origin, in the transporting of such eggs to the hatchery, in the storing of eggs, and in the dipping of eggs to disinfect them. Thus, it is contemplated that using the case described, once eggs have been placed in trays at the point of origin and stacked in the case, no further handling of individual eggs is required until transfer to hatching trays occurs.

While the specific embodiment of the invention has been described, it is contemplated that variations and modifications are possible without departing from the invention.

It is claimed and desired to secure by Letters Patent:

1. A wire case for holding stacked egg-carrying trays comprising:
   a wire-strand floor and opposed wire-strand end walls joined to and projecting upwardly from opposed ends of said floor;
   a wire-strand cover for the case, hinge means connecting the cover at one end to the upper margin of one end wall, and means detachably fastening the cover at its opposite end to the upper margin of the other end wall,
   said cover on detachment from said other end wall being swingable about the axis provided by said hinge means to open up the top of the case,
   said end walls, on each of the opposed sides of the case, in a region extending up from the floor being unjoined from each other save for the joinder provided by said cover when such is detachably fastened to said other end wall,
   said cover having tray-seating means located downwardly from the plane of the top of the cover for seating the top of a tray placed thereagainst and inhibiting its lateral shifting,
   said floor having tray-seating means located upwardly from the plane of the bottom of the floor for seating a tray placed thereon and inhibiting its lateral shifting.

2. A case for holding stacked, egg-carrying trays comprising:
   A rectangular floor and opposed end walls joined to and projecting upwardly from opposite ends of said floor,
   a rectangular cover spanning the top margins of said end walls and detachably connected in place in said position, said cover being detachable to enable movement of the cover away from its position spanning said end walls,
   said floor including a floor frame member extending in a rectangular course adjacent the perimeter of the floor whose bottom surface defines the plane of the bottom of the floor,
   said cover comprising a cover frame member extending in a rectangular course adjacent the perimeter of the cover whose upper surface defines the top of the cover,
   said floor frame member and cover frame member having a construction permitting inter-nesting thereof with the case mounted on the top of a like case.

3. A wire case for holding stacked egg-carrying trays comprising:
   a rectangular floor including a frame member extending in a rectangular course adjacent the perimeter of the floor lying in a plane and a wire-strand tray-seating means paralleling the plane of the frame member but spaced upwardly therefrom,
   opposed wire-strand end walls joined to and projecting upwardly from said floor frame member,
   a rectangular cover spanning the upper margins of said end walls including a cover frame member extending in a rectangular course adjacent the perimeter of the cover and lying in a plane and a wire-strand tray-seating means paralleling the plane of the cover frame member but spaced downwardly therefrom,
   said cover being detachably connected in a position spanning said upper margins of the end walls and detachment of the cover permitting the same to be removed from said position to open up the space between said end walls,
   said end walls on each of the opposed sides of the case, in a region extending up from said floor, being unjoined from each other save for said cover when such is detachably connected in position,
   said floor frame member and cover frame member having a construction permitting inter-nesting thereof with the wire case mounted on the top of a like wire case.

* * * * *